United States Patent [19]

Takahashi et al.

[11] 4,364,582
[45] Dec. 21, 1982

[54] VEHICLE BODY SUSPENSION SYSTEM

[75] Inventors: Noriyuki Takahashi, Tokyo; Takumi Sakaguchi; Yasutomo Tajima, both of Gyoda, all of Japan

[73] Assignee: Honda Giken Kogyo Kabushiki Kaisha & Showa Mfg. Co., Ltd., Tokyo, Japan

[21] Appl. No.: 216,940

[22] Filed: Dec. 16, 1980

[30] Foreign Application Priority Data

Dec. 17, 1979 [JP] Japan .................. 54-162804
Dec. 17, 1979 [JP] Japan .................. 54-162805

[51] Int. Cl.$^3$ .................................... B60G 3/00
[52] U.S. Cl. ........................... 280/698; 188/298; 267/64.23
[58] Field of Search ............... 280/662, 666, 667, 668, 280/670, 672, 692, 693, 697, 698, 701; 188/298, 314; 267/64.22, 64.23, 64.27

[56] References Cited

U.S. PATENT DOCUMENTS 3,770,258 11/1973 Takahashi .................. 188/298
3,955,807 5/1976 Takahashi .................. 267/64.23
4,234,172 11/1980 Takahashi .................. 188/298

Primary Examiner—Joseph F. Peters, Jr.
Assistant Examiner—John A. Carroll
Attorney, Agent, or Firm—Irving M. Weiner; Pamela S. Burt; John L. Shortley

[57] ABSTRACT

A vehicle body suspension system comprising a piston-cylinder assembly provided between a vehicle wheel and a vehicle body. The piston, which is disposed within the cylinder connected to the wheel, and the piston rod coupled to the piston, are each formed with an oil channel extending axially therethrough. The end of the piston rod which is remote from the piston is connected to the vehicle body by means of an annular elastic member arranged around such end of the piston rod. An oil chamber having a variable volume is provided, and has part of its peripheral wall formed by part of the elastic member. A first damper arrangement is provided between the oil chamber and the oil channel for action during contraction of the system, and a second damper arrangement is provided in the piston for action during elongation of the system. An auxiliary vehicle body suspension spring is provided between the cylinder and the piston rod. A vehicle body height adjusting piston may be provided between the piston rod and the elastic member, and secured to the end of the piston rod remote from the main piston. The first damper arrangement is provided with an automatic damping adjustment arrangement.

14 Claims, 6 Drawing Figures

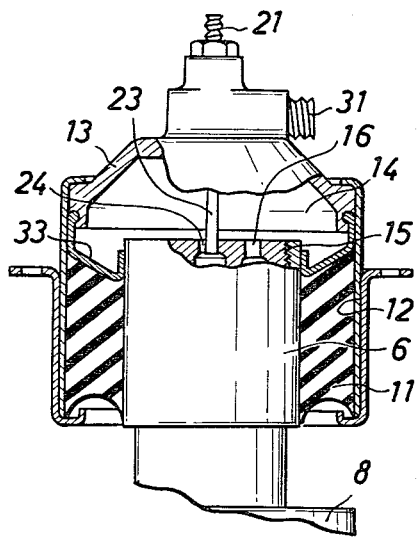
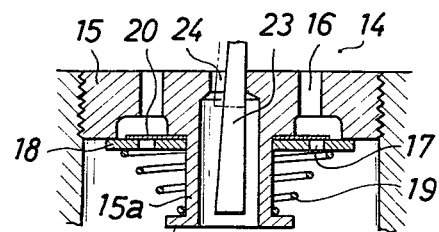
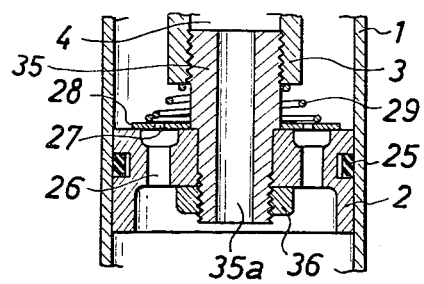

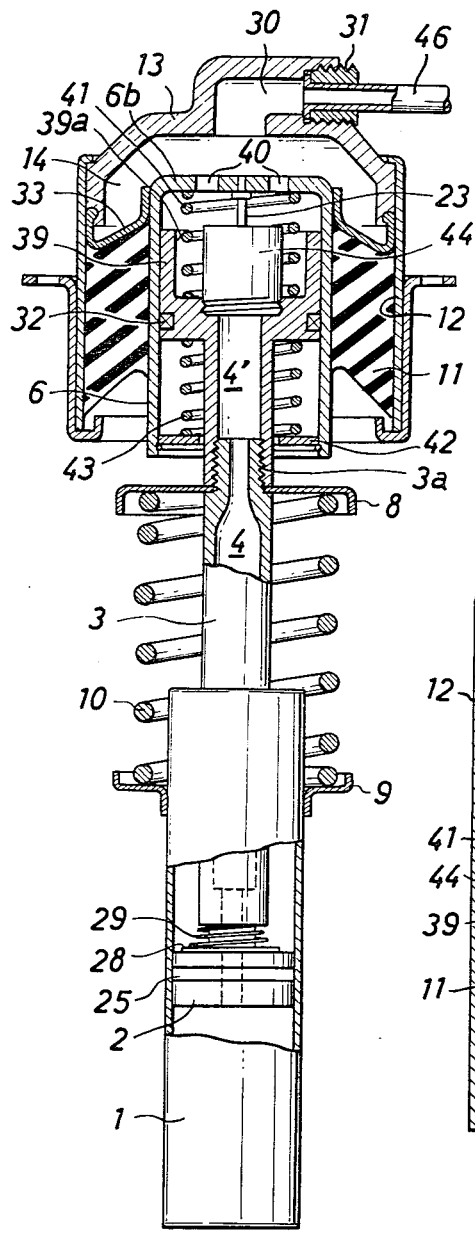

VEHICLE BODY SUSPENSION SYSTEM

BACKGROUND OF THE INVENTION

1. Field of the Invention

The present invention relates to an improved suspension system for supporting the body of a vehicle.

2. Description of Relevant Art

In Japanese Patent Publication No. 51-21218 (76-21218) there is disclosed a vehicle body suspension system which comprises a hydraulic oil damper wherein a piston rod, which is coupled to a piston received within a cylinder, is formed with an oil channel extending axially therethrough. The piston rod has an upper end connected to the vehicle body by means of an annular elastic member made of rubber or the like and arranged concentrically of the piston rod. An oil chamber is provided which has a portion of its peripheral wall formed by an upper surface of the elastic member, and such oil chamber communicates with the interior of the cylinder through the axial oil channel in the piston rod. The hydraulic oil damper is thus arranged such that the static load of the vehicle body acts upon the oil filled within the hydraulic oil damper to thereby reduce the force being directly applied to the elastic member. In accordance with such suspension system, the space above the elastic member which formerly was not utilized in prior known systems of such type is utilized for the variable volume oil chamber which accommodates oil overflowing from the cylinder to render the entire system compact in size. Further, the oil pressure within such oil chamber acts upon the elastic member so as to urge its upper surface against the upward movement of the piston rod so as to restrain deformation of the elastic member and thus increase the wear life of the elastic member.

The above-described known suspension system suffers from the following disadvantages.

First, because the high oil pressure within the cylinder acts directly upon the elastic member through the oil channel in the piston rod during contraction of the hydraulic oil damper which is due to an increased load applied to the vehicle body, the elastic member is still subjected to a large amount of deformation, resulting in extensive damaging or deterioration of the elastic member and its peripheral oil seals. Secondly, although in the aforesaid known suspension system the height of the vehicle body can be adjusted by varying the amount of oil charged within the interior of the system, the internal oil pressure has to be elevated to a very high value to obtain a relatively large height of the vehicle body, which may result in oil leakage. Thirdly, due to the aforesaid high internal oil pressure, strict machining tolerances are required for the piston, the cylinder, etc., which may lead to a complex construction of the system.

SUMMARY OF THE INVENTION

The present invention provides a suspension system for supporting the body of a vehicle which includes a cylinder connected to a wheel of the vehicle, a piston slidably disposed within the cylinder, and a piston rod coupled to the piston, the piston and piston rod having an oil channel extending axially therethrough. Coupling means including an annular elastic member is arranged concentrically around an end of the piston rod remote from the piston, and the coupling means connects the piston rod to the body of the vehicle through the elastic member. An oil chamber having a peripheral wall defined in part by part of the peripheral surfaces of the elastic member has a volume varying with deformation of the elastic member. First damper means is provided between the oil channel and the oil chamber for restraining movement of the piston in the direction of the wheel when the piston is moved in the direction of the wheel relative to the cylinder. Second damper means is provided on the piston for restraining movement of the piston in the direction of the vehicle body when the piston is moved in the direction of the vehicle body.

It is an object of the present invention to provide a vehicle body suspension system in which damper means is provided between the oil channel in the piston rod and the variable-volume oil chamber, which acts during contraction of the system, and an auxiliary suspension spring is provided between the cylinder and the piston rod. The oil pressure within the system and the static load to be applied to the elastic member can be set at respective appropriate values by adjusting the damping characteristic of the damper means and/or the setting load of the auxiliary suspension spring, to thereby prevent damage to and deterioration of the elastic member, the oil seals, etc.

Another object of the invention is to provide a vehicle body suspension system which permits adjustment of the vehicle body height merely by slightly varying the internal oil pressure while maintaining the same pressure at sufficiently low values, to thereby obtain a wide range of vehicle body heights.

The above and further objects, features and advantages of the invention will become more apparent from the following detailed description when read in conjunction with the accompanying drawings.

BRIEF DESCRIPTION OF THE DRAWINGS

FIG. 2 is an enlarged longitudinally sectioned view of part of the system of FIG. 1.

FIG. 3 is a longitudinally sectioned view of part of the piston employed in the system of FIG. 1.

FIG. 4 is a view showing part of the system of FIG. 1 during operation thereof.

FIG. 5 is a side view, partly in longitudinal section, of part of the vehicle body suspension system according to a second embodiment of the present invention.

FIG. 6 is an enlarged longitudinally sectioned view of part of the system of FIG. 5 adapted for a vehicle body height which is different from that in FIG. 5.

DETAILED DESCRIPTION OF PREFERRED EMBODIMENTS

Figure 1:
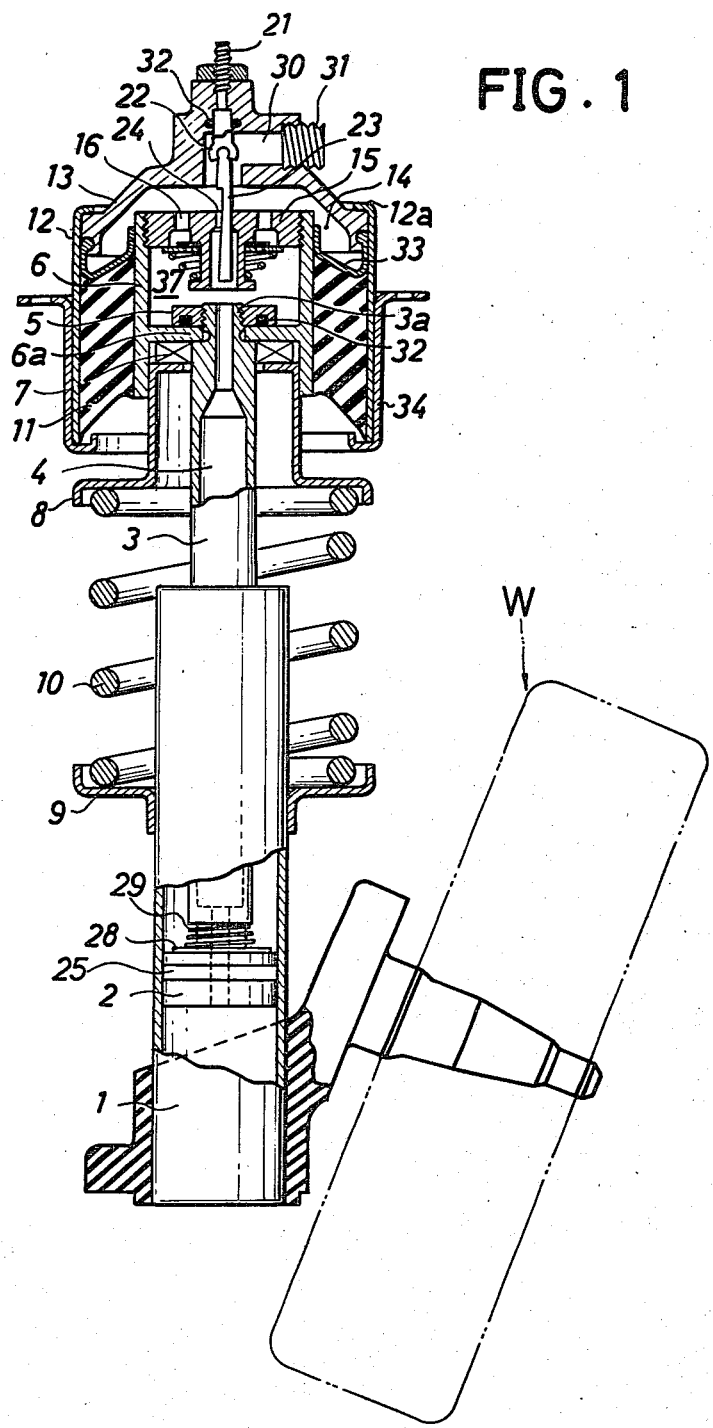
FIG. 1 is a side view, partly in longitudinal section, of the vehicle body suspension system according to a first embodiment of the present invention.

With reference to FIGS. 1 through 4, there is shown a vehicle body suspension system in accordance with a first embodiment of the present invention. The system comprises a hydraulic oil damper which primarily comprises a cylinder 1, the lower end of which is to be connected to the shaft of a front wheel W of a vehicle, and a piston 2 slidably disposed within the cylinder 1. If required, another piston (not shown) may be disposed in a free state within a lower portion of the cylinder 1, with a gas sealingly filled under high pressure between the lower end of such additional piston and the cylinder 1. A piston rod 3 is coupled to the piston 2, and is formed of a hollow tubular member with the interior thereof formed with an oil passage bore 4 opening in the opposite ends thereof. The piston rod 3 has an upper end 3a having a threaded peripheral surface, the end 3a having a smaller diameter than the remainder of the piston rod. A cylindrical member 6 is fitted at its intermediate wall 6a on the upper end 3a and secured to the piston rod 3 by means of a nut 5 threaded on the end 3a. An upper spring seat 8 is fitted on the wall 6a with a ball bearing 7 disposed therebetween, and a lower spring seat 9 is fitted on the cylinder 1. An auxiliary suspension spring 10 is interposed in a taut state between the spring seats 8, 9 to urge them in directions away from each other. An annular elastic member 11, which is made of rubber or the like, is secured by baking at its inner peripheral surface to the outer peripheral surface of the cylindrical member 6, and the elastic member 11 is secured by baking at its outer peripheral surface to the inner peripheral surface of a cylindrical outer wall member 12 which is to be fixed on the vehicle body 34. A cover 13 is fitted in the upper end portion of the outer wall member 12 in such a manner that the lower peripheral edge of the cover 13 is prevented from disengaging from the member 12 by means of a radially inwardly bent upper edge 12a of member 12. The cover 13 covers the upper portion of the cylindrical member 6 in spaced relation therefrom to define an oil chamber 14 which has part of its peripheral wall formed by an upper surface of the elastic member 11 so that the volume thereof varies with deformation of the elastic member 11. A partition member 15 is fitted in the upper end of the cylindrical member 6; and an oil space 37 is defined by a lower surface of the partition member 15, an inner peripheral surface of the cylindrical member 6, and an upper surface of the intermediate wall 6a. As clearly shown in FIG. 2, the partition member 15 is formed with axial through bores 16 and provided with a disc valve 18 having orifices 17 and disposed over the through bores 16. The disc valve 18 is urged against the lower surface of the partition member 15 by means of a spring 19 arranged in a taut state between the valve 18 and a flange 15b formed on a central protuberance 15a extending downwardly from the partition member 15. A valve 20, which is formed of a thin elastic plate, is interposed between the lower surface of the partition member 15 and the valve 18 over the orifices 17.

As shown in FIG. 1, cover 13 is formed in the upper portion thereof with an oil charge port 30. A threaded member 21 is threadedly mounted through the uppermost portion of the cover 13, and the lower end of threaded member 21 is coupled to the upper end of a pin 23 by means of a universal joint 22. The pin 23 has its lower portion loosely fitted in an orifice 24 formed in a central portion of the partition member 15, and has a side surface cut obliquely, such that the cross sectional area of pin 23 increases towards the lower end thereof. Oil is charged through the port 30 in the cover 13 so as to entirely fill the interior of the cylinder 1 and the cylindrical member 6 as well as the oil chamber 14 without any void spaces, and then the port 30 is closed with a plug 31 in a liquid-tight manner.

As shown in FIG. 3, the piston 2 is fitted on a threaded member 35 formed with a central axial through bore 35a, and the threaded member 35 is in turn threaded to the lower end of the piston rod 3, with piston 2 being fixed to member 35 by means of a nut 36. The piston 2 carries a piston ring 25 fitted therein along the outer peripheral surface thereof, and is further formed with axial through bores 26. A disc valve 28 having orifices 27 is disposed in contact with the upper surface of the piston 2 and over the through bores 26. The valve 28 is urged against the upper surface of the piston 2 by means of a spring 29 interposed between the valve 28 and the lower end surface of the piston rod 3.

Referring again to FIG. 1, O rings 32 are provided between the threaded member 21 and the cover 13, between the piston rod 3 and the cylindrical member 6, between the nut 5 and the cylindrical member 6, and at other required positions (not shown) of the system to seal such portions. A flexible film 33 is applied over the upper surface of the elastic member 11 to prevent the member 11 from being dissolved by the oil.

Assuming that the weight of the vehicle body applied to the above-described suspension system according to the invention is W, the setting load of the auxiliary suspension spring 10 is F, and the cross sectional area of the piston rod 3 is S, the pressure P within the cylinder 1 is obtained by the following formula:

$$P=(W-F)/S.$$

Therefore, by setting the setting load F of the spring 10 at a suitable value, it is possible to avoid an excessively high pressure P which might damage the oil seals, etc. and to prevent the whole load W from being applied to the elastic member 11 alone so as to avoid deterioration of same.

With the above-described arrangement according to the first embodiment of the invention, when the wheel of the vehicle is subjected to impacts or the like so that force is produced which acts upon the hydraulic oil damper comprised mainly of the cylinder 1 and the piston 2 to cause contraction of same, i.e., with piston 2 being moved downwardly relative to cylinder 1 in FIG. 1, the valve 28 on the piston 2 is opened to allow oil present on the lower side of the piston 2 to easily flow through the through bores 26 into the upper side of the piston 2. At the same time, an amount of oil corresponding to the volume of the portion of the piston rod 3 by which the piston rod 3 has been downwardly displaced from the upper end of cylinder 1 toward the lower end of cylinder 1 is fed from the interior of the cylinder on the lower side of piston 2 into the space 37 through the oil channel 4 in the piston rod 3. The oil thus fed into the space 37, on one hand, flows into the variable-volume chamber 14 through the orifice 24 in the partition member 15, and on the other hand, flows through the orifices 17 into the oil chamber 14 by upwardly bending the valve 20 with its pressure. Because the oil passes through the orifices 24 and 17, the impacts to which the vehicle wheel is subjected are suitably damped as they are transmitted to the vehicle body.

During the aforesaid contraction stroke of the hydraulic oil damper, when piston rod 3 is displaced into cylinder 1, the elastic member 11 is deformed so as to cause the oil chamber 14 to become expanded as shown in FIG. 4, which is accompanied by upward lifting of the pin 23 so that it engages in the orifice 24 at its lower portion closer to its lower end. Because the cross sectional area of the pin 23 increases toward the lower end as described hereinabove, the oil flow passage formed in the orifice 24 gradually decreases in cross sectional area as the pin 23 is moved upwardly. Thus, as the damper is contracted, the degree of damping of impacts and vibrations becomes larger. Therefore, even when the damper is subjected to large vibrations, it will not be contracted to its minimum allowable length, thus avoiding the occurrence of mechanical impacts which would otherwise be caused by contraction of the damper. Further, the coupling of the pin 23 to the threaded member 21 by means of the universal joint 22 permits smooth movement of the pin 23 in the orifice 24. Still further, the position of the threaded member 21 can be adjusted from the outside to enable suitable setting of the impact and vibration damping characteristics of the system.

The hydraulic oil damper, when contracted as described hereinabove, is thereafter elongated by the force of the spring 10. During such elongation stroke, the valve 18, which then closes the through bores 16 in the partition member 15, is opened to allow oil in the oil chamber 14 to easily flow into the lower side of the piston 2 within the cylinder 1 through the through bores 16, the space 37, the oil channel 4 in the piston rod 3, and the through bore 35a in piston 2. Because high oil pressure at such time prevails in the cylinder 1 on the upper side of the piston 2 such that valve 28 on piston 2 is closed, the oil within cylinder 1 on the upper side of piston 2 flows into the lower side of piston 2 through the orifices 27 in the valve 28 at a restricted flow rate, thus retarding the elongating speed of the hydraulic oil damper so as to obtain a relatively large degree of damping. Further, the coupling of the vehicle body to the wheel by means of the elastic member 11 made of rubber or the like in addition to the assembly of the cylinder 1 and piston 2 prevents the transmission of high-frequency fine vibrations to the vehicle body.

With reference to FIGS. 5 and 6 which illustrate a vehicle body suspension system according to a second embodiment of the invention, there is shown a vehicle body height adjusting piston 39 threadedly mounted on the upper end 3a of the piston rod 3. Piston 39 is slidably received within a cylindrical member 6 which has no intermediate wall corresponding to the one 6a illustrated in FIG. 1 and which is movable relative to the piston rod 3. An oil seal 32 is provided between the outer peripheral surface of the piston 39 and the inner peripheral surface of the cylindrical member 6. The cylindrical member 6 is formed integrally with an upper wall 6b which is formed with through bores 40. A spring 41 is interposed in a taut state between the lower surface of the upper wall 6b and the bottom surface of a recess 39a formed in the upper portion of piston 39, and another spring 43 is interposed between a spring seat 42 secured to the lower end of the cylindrical member 6 and the lower surface of the piston 39, respectively, to simultaneously urge the piston 39 in opposite axial directions.

A barrel 44 having an internal blind bore is threaded in the bottom of the recess 39a of the piston 39 in an inverted manner. The barrel 44 has a wall 44a serving as a partition wall and formed with through bores 16 as shown in FIG. 6. A disc valve 18 is arranged on the wall 44a over the through bores 16 and is urged against the lower surface of the wall 44a of barrel 44 by the force of a spring 19 interposed in a taut state between the valve 18 and a flange 44c formed on a central protuberance 44b extending downwardly from the bottom wall 44a. A valve 20 formed of a thin elastic plate is interposed between the wall 44a and the valve 18.

A hole 45 is formed in the central portion of the upper wall 6b of the cylindrical member 6, and pin 23 is inserted therein at its upper end, the pin 23 being in turn inserted at its lower end portion in an orifice 24 formed in the wall 44a of barrel 44. Pin 23 is tapered along its length such that its cross sectional area increases towards the lower end thereof.

An oil passage bore 4' is formed in a lower portion of the piston 39 to permit communication between the interior of barrel 44 and the oil channel 4 in the piston rod 3.

As shown in FIG. 5, plug 31, which is threadedly fitted in the oil charge port 30 formed in the cover 13, has a conduit 46 which has one end fitted through the plug 31 and the other end connected to a high pressure oil source, not shown. The conduit 46 is normally closed by a cock or the like, not shown.

The other parts of the system according to the second embodiment of the invention are identical with or similar to the corresponding parts of the system shown in FIGS. 1 through 4, and accordingly like reference numerals have been employed to designate like parts in FIGS. 5 and 6.

With the above-described arrangement of FIGS. 5 and 6, by charging high pressure oil supplied from the high pressure oil source through the conduit 46 into the oil chamber 14 so as to slightly elevate the internal oil pressure P, the oil under such increased pressure is delivered into the upper side of the piston 2 within the cylinder 1 through the oil chamber 14, the interior of the cylindrical member 6, the oil passage bore 4' in the piston 39, the oil channel 4 in piston rod 3, through bore 35a in piston 2, and the through bores 26 in the piston 2. Accordingly, the piston 39 is displaced downwardly in the cylindrical member 6 and at the same time the oil chamber 14 is expanded through deformation of the elastic member 11 from the positions shown in FIG. 5 to those indicated by the solid lines in FIG. 6, to thus obtain an elevated vehicle body height. On the other hand, when the oil in the oil chamber 14, etc. is partly discharged from the hydraulic oil damper through the conduit 46, the piston 39 is displaced upwardly in a manner contrary to that mentioned above and accordingly the oil chamber 14 is reduced in volume to thus obtain a lowered vehicle body height.

As described hereinabove, the arrangement of the second embodiment having the vehicle body height adjusting piston 39 engaged within the cylindrical member 6 makes it possible to vary the height of the vehicle body over a wide range by slightly varying the internal oil pressure. Further, the provision of the two springs 41, 43 on the piston 39 in a manner urging it in opposite axial directions makes it possible to smoothly adjust the vehicle body height substantially in proportion to a change in the internal oil pressure. Still further, the provision of the pin 23 having a cross sectional area gradually changing along its length in the bore 24 provides an automatic increase in the degree of damping during contraction of the hydraulic oil damper if the vehicle body height is elevated when the vehicle body is heavily loaded. This can prevent excessive contraction of the suspension system even if the vehicle body is subjected to large vibrations, to thereby eliminate any possible occurrence of mechanical impacts on such occasion.

In the above-described second embodiment of the invention, the operation of the suspension system during contraction and during elongation is substantially identical with that of the first embodiment described with reference to FIGS. 1 through 4.

Although there have been described what are at present considered to be the preferred embodiments of the invention, it will be understood that various modifications may be made therein without departing from the spirit or essential characteristics thereof. The present embodiments are therefore to be considered in all respects as illustrative, and not restrictive. The scope of the invention is indicated by the appended claims rather than by the foregoing description.

We claim:

1. A suspension system for supporting the body of a vehicle, comprising:
   a cylinder connected to a wheel of said vehicle;
   a piston slidably disposed within said cylinder;
   a piston rod coupled to said piston;
   said piston and said piston rod having an oil channel extending axially therethrough;
   coupling means including an annular elastic member arranged concentrically around an end of said piston rod remote from said piston, said coupling means connecting said piston rod to the body of said vehicle through said elastic member;
   an oil chamber having a peripheral wall defined in part by part of the peripheral surfaces of said elastic member, said oil chamber having a volume which varies in accordance with deformation of said elastic member;
   first damper means provided between said oil channel and said oil chamber for restraining movement of said piston in the direction of said wheel when said piston is moved in said direction relative to said cylinder; and
   second damper means provided on said piston for restraining movement of said piston in the direction of said vehicle body when said piston is moved in the direction of said vehicle body.

2. A suspension system according to claim 1, further comprising:
   a partition wall provided between said oil channel and said variable-volume oil chamber;
   said partition wall having a plurality of through bores formed therethrough which permit communication of said oil channel with said oil chamber;
   a disc valve having a plurality of orifices, said disc valve being arranged on a side surface of said partition wall facing said oil channel over said through bores; and
   a spring urging said disc valve against said side surface of said partition wall.

3. A suspension system according to claim 1, further comprising:
   a spring arranged between said cylinder and said piston rod so as to urge said cylinder and said piston rod in directions away from each other.

4. A suspension system according to claim 1, further comprising:
   a partition wall provided on said piston rod and disposed between said oil channel and said variable-volume oil chamber;
   said partition wall having an axial orifice formed therethrough which permits communication of said oil channel with said oil chamber; and
   a pin having one end thereof fixed with respect to the body of said vehicle and the other end thereof engaged in said orifice, said pin having a cross sectional area which increases towards said other end thereof.

5. A suspension system according to claim 2, further comprising:
   a valve formed of a thin elastic plate and arranged between said partition wall and said disc valve over said orifices in said disc valve.

6. A suspension system according to claim 1, 2, 3, 4 or 5, wherein:
   said piston has a plurality of through bores extending axially therethrough;
   a disc valve having a plurality of orifices is arranged on a side surface of said piston facing said piston rod over said plurality of through bores extending through said piston; and
   a spring is disposed so as to urge said disc valve against said side surface of said piston facing said piston rod.

7. A suspension system according to claim 1, 2, 3, 4 or 5, further comprising:
   a cylindrical member secured to an end of said piston rod remote from said piston; and
   said elastic member being secured at an inner peripheral surface thereof to an outer peripheral surface of said cylindrical member.

8. A suspension system according to claim 1, further comprising:
   a cylindrical member secured at an outer peripheral surface thereof to an inner peripheral surface of said elastic member;
   a second piston secured to an end of said piston rod remote from said piston and slidably disposed within said cylindrical member;
   a partition wall provided with a plurality of through bores which permit communication of said oil channel with said variable-volume oil chamber;
   a disc valve having a plurality of orifices, said disc valve being arranged on a side surface of said partition wall facing said oil channel over said through bores; and
   a spring urging said disc valve against said side surface of said partition wall.

9. A suspension system according to claim 8, further comprising:
   a spring arranged between said cylinder and said piston rod so as to urge said cylinder and said piston rod in directions away from each other.

10. A suspension system according to claim 8, further comprising:
    a valve formed of a thin elastic plate and arranged between said partition wall and said disc valve over said orifices in said disc valve.

11. A suspension system according to claim 9, further comprising:
    a valve formed of a thin elastic plate and arranged between said partition wall and said disc valve over said orifices in said disc valve.

12. A suspension system according to claim 8, further comprising:
    a pin having one end thereof fixed to said cylindrical member and the other end thereof engaging in an axial orifice formed through said partition wall, said pin having a cross sectional area which varies along a length thereof.

13. A suspension system according to claim 9, further comprising:
    a pin having one end thereof fixed to said cylindrical member and the other end thereof engaging in an axial orifice formed through said partition wall, said pin having a cross sectional area which varies along a length thereof.

14. A suspension system according to claim 8, 9, 10, 11, 12 or 13, further comprising:
    two springs provided within said cylindrical member and urging said second piston in opposite axial directions.

* * * * *